United States Patent
Johnson

(10) Patent No.: US 10,432,343 B2
(45) Date of Patent: *Oct. 1, 2019

(54) INTEGRATION OF CELLULAR PHONE DETECTION AND REPORTING INTO A PRISON TELEPHONE SYSTEM

(71) Applicant: **Global Tel*Link Corporation**, Reston, VA (US)

(72) Inventor: Garth Johnson, Indianapolis, IN (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,985

(22) Filed: Jan. 30, 2018

(65) Prior Publication Data

US 2018/0159653 A1    Jun. 7, 2018

Related U.S. Application Data

(63) Continuation of application No. 15/262,842, filed on Sep. 12, 2016, now Pat. No. 9,887,800, which is a
(Continued)

(51) Int. Cl.
   *H04M 1/66*   (2006.01)
   *H04K 3/00*   (2006.01)
   (Continued)

(52) U.S. Cl.
   CPC ................ *H04K 3/80* (2013.01); *H04K 3/40* (2013.01); *H04M 3/2281* (2013.01);
   (Continued)

(58) Field of Classification Search
   CPC ....... H04W 8/00; H04W 16/20; H04W 16/24; H04W 16/32; H04W 84/10–22
   See application file for complete search history.

(56) References Cited

U.S. PATENT DOCUMENTS

| 4,136,764 A | 1/1979 | Johnson |
| 4,598,810 A | 7/1986 | Shore et al. |
(Continued)

FOREIGN PATENT DOCUMENTS

| EP | 0159359 A1 | 10/1985 |
| EP | 0239110 A2 | 9/1987 |
(Continued)

OTHER PUBLICATIONS

Final Office Action for U.S. Appl. No. 13/562,057, dated Apr. 16, 2013; 29 pages.
(Continued)

*Primary Examiner* — San Htun
(74) *Attorney, Agent, or Firm* — Sterne, Kessler, Goldstein & Fox P.L.L.C.

(57) ABSTRACT

The present subject matter is directed to an apparatus and methodology for monitoring for the occurrence of use of unauthorized telecommunications equipment within a designated area. The present subject matter has particular utility to the corrections environment in that it discloses a methodology for detecting and reporting the unauthorized operation of cellular telephones within a corrections facility. The present technology may be used advantageously in combination with inmate telephone systems to transmit information to appropriate personnel in the form of email messages and/or voice communications by way of telephone local or corrections facility external telephone lines. The present technology also provides for recordation and storage of time, date and location information for detected events.

20 Claims, 1 Drawing Sheet

Related U.S. Application Data continuation of application No. 14/096,291, filed on Dec. 4, 2013, now Pat. No. 9,444,574, which is a continuation of application No. 13/562,057, filed on Jul. 30, 2012, now Pat. No. 8,606,229, which is a continuation of application No. 11/504,979, filed on Aug. 16, 2006, now Pat. No. 8,233,880.

(51) Int. Cl.

| | | |
|---|---|---|
| *H04W 48/02* | (2009.01) | |
| *H04M 11/04* | (2006.01) | |
| *H04W 12/08* | (2009.01) | |
| *H04W 64/00* | (2009.01) | |
| *H04M 3/22* | (2006.01) | |
| *H04W 4/021* | (2018.01) | |
| *H04M 3/42* | (2006.01) | |
| *H04M 3/00* | (2006.01) | |
| *H04W 48/04* | (2009.01) | |
| *H04L 29/06* | (2006.01) | |
| *H04W 12/12* | (2009.01) | |

(52) U.S. Cl.
CPC .......... *H04M 11/04* (2013.01); *H04W 4/022* (2013.01); *H04W 12/08* (2013.01); *H04W 48/02* (2013.01); *H04W 64/00* (2013.01); *H04K 2203/16* (2013.01); *H04K 2203/32* (2013.01); *H04L 63/1408* (2013.01); *H04M 2201/18* (2013.01); *H04W 12/12* (2013.01); *H04W 48/04* (2013.01)

(56) References Cited

U.S. PATENT DOCUMENTS

| | | |
|---|---|---|
| 4,866,661 A | 9/1989 | de Prins |
| 4,896,024 A | 1/1990 | Morello et al. |
| 4,951,308 A | 8/1990 | Bishop et al. |
| 5,172,829 A | 12/1992 | Dellicker |
| 5,386,462 A | 1/1995 | Schlamp |
| 5,678,200 A * | 10/1997 | Levi .................... H04B 1/3877 379/441 |
| 5,744,933 A | 4/1998 | Inoue et al. |
| 5,819,981 A | 10/1998 | Cox |
| 5,940,764 A | 8/1999 | Mikami |
| 6,064,886 A * | 5/2000 | Perez .................... H04W 84/14 455/426.2 |
| 6,201,973 B1 | 3/2001 | Kowaguchi |
| 6,496,703 B1 | 12/2002 | da Silva |
| 6,799,052 B2 | 9/2004 | Agness et al. |
| 6,799,084 B2 | 9/2004 | Grobler |
| 6,830,160 B2 | 12/2004 | Risolia |
| 6,866,193 B1 | 3/2005 | Shimizu et al. |
| 6,880,754 B1 | 4/2005 | Lie-Nielsen et al. |
| 6,896,145 B2 | 5/2005 | Higgins et al. |
| 6,975,941 B1 | 12/2005 | Lau et al. |
| 7,142,108 B2 | 11/2006 | Diener et al. |
| 7,233,916 B2 | 6/2007 | Schultz |
| 8,019,354 B2 | 9/2011 | Rae et al. |
| 8,078,190 B2 | 12/2011 | Noonan et al. |
| 8,099,080 B1 | 1/2012 | Rae et al. |
| 8,106,752 B2 | 1/2012 | Golden |
| 8,175,577 B1 | 5/2012 | Harvey et al. |
| 8,233,880 B2 | 7/2012 | Johnson et al. |
| 8,238,936 B2 | 8/2012 | Nadler et al. |
| 8,248,238 B2 | 8/2012 | Butler et al. |
| 8,254,886 B2 | 8/2012 | Salkini et al. |
| 8,311,892 B2 | 11/2012 | Junger |
| 8,346,281 B2 | 1/2013 | Noonan et al. |
| 8,365,868 B2 | 2/2013 | Johnson et al. |
| 8,421,630 B2 | 4/2013 | Butler et al. |
| 8,509,740 B2 | 8/2013 | Salkini et al. |
| 8,509,818 B2 | 8/2013 | Schork et al. |
| 8,583,078 B2 | 11/2013 | Sweeney et al. |
| 8,606,229 B2 | 12/2013 | Johnson |
| 8,626,195 B2 | 1/2014 | Noonan et al. |
| 8,750,903 B1 | 6/2014 | Fitzsimmons et al. |
| 8,825,011 B2 | 9/2014 | Salkini et al. |
| 8,981,925 B2 | 3/2015 | Chapin et al. |
| 8,983,446 B2 | 3/2015 | Nadler et al. |
| 9,295,071 B2 | 3/2016 | Salkini et al. |
| 9,301,102 B2 | 3/2016 | Noonan et al. |
| 9,313,639 B2 | 4/2016 | Salkini et al. |
| 9,332,412 B2 | 5/2016 | Salkini et al. |
| 9,332,520 B2 | 5/2016 | Nadler et al. |
| 9,355,515 B2 | 5/2016 | Brahami et al. |
| 9,444,574 B2 | 9/2016 | Johnson |
| 9,508,212 B2 | 11/2016 | Peters et al. |
| 9,584,252 B1 | 2/2017 | Salyers et al. |
| 9,681,360 B1 | 6/2017 | Salyers et al. |
| 9,887,800 B2 | 2/2018 | Johnson |
| 9,900,428 B1 | 2/2018 | Hodge et al. |
| 2001/0036821 A1 * | 11/2001 | Gainsboro .......... H04M 3/2281 455/410 |
| 2001/0041987 A1 | 11/2001 | Ichikawa |
| 2002/0036995 A1 | 3/2002 | Dalsgaard |
| 2002/0094780 A1 | 7/2002 | Payton et al. |
| 2002/0116208 A1 | 8/2002 | Chirnomas |
| 2003/0017821 A1 * | 1/2003 | Irvin ....................... H04W 4/02 455/410 |
| 2003/0030539 A1 | 2/2003 | McGarry et al. |
| 2003/0143943 A1 | 7/2003 | Kline |
| 2004/0044697 A1 | 3/2004 | Nixon |
| 2005/0060246 A1 | 3/2005 | Lastinger et al. |
| 2005/0211768 A1 | 9/2005 | Stillman |
| 2006/0079218 A1 | 4/2006 | Aldridge et al. |
| 2006/0165217 A1 | 7/2006 | Skatter |
| 2007/0041545 A1 | 2/2007 | Gainsboro |
| 2007/0041581 A1 | 2/2007 | Frost |
| 2007/0050271 A1 | 3/2007 | Ufford et al. |
| 2007/0099667 A1 | 5/2007 | Graham et al. |
| 2007/0159991 A1 * | 7/2007 | Noonan .................... G01S 5/02 370/310 |
| 2008/0005225 A1 | 1/2008 | Ferguson et al. |
| 2008/0043993 A1 | 2/2008 | Johnson |
| 2008/0057976 A1 | 3/2008 | Rae et al. |
| 2008/0058985 A1 | 3/2008 | Alcov |
| 2008/0168515 A1 | 7/2008 | Benson et al. |
| 2010/0105416 A1 | 4/2010 | Nadler et al. |
| 2010/0151820 A1 | 6/2010 | Mulherin et al. |
| 2011/0093622 A1 | 4/2011 | Hahn et al. |
| 2011/0258135 A1 | 10/2011 | Paul et al. |
| 2012/0040650 A1 | 2/2012 | Rosen |
| 2012/0078413 A1 | 3/2012 | Baker |
| 2012/0215347 A1 | 8/2012 | Illingworth et al. |
| 2012/0248183 A1 | 10/2012 | Cook |
| 2012/0295646 A1 | 11/2012 | Johnson |
| 2013/0036018 A1 | 2/2013 | Dickerson |
| 2013/0307533 A1 | 11/2013 | Keene et al. |
| 2014/0018059 A1 | 1/2014 | Noonan |
| 2014/0066012 A1 | 3/2014 | Sweeney et al. |
| 2014/0120827 A1 | 5/2014 | Johnson |
| 2014/0128023 A1 | 5/2014 | Guerra |
| 2014/0148947 A1 | 5/2014 | Levesque et al. |
| 2014/0194084 A1 | 7/2014 | Noonan et al. |
| 2014/0253322 A1 | 9/2014 | Chapin et al. |
| 2014/0297487 A1 | 10/2014 | Bashkin |
| 2014/0330682 A1 | 11/2014 | Knight |
| 2014/0344116 A1 | 11/2014 | Paracha et al. |
| 2014/0367466 A1 | 12/2014 | Pai et al. |
| 2015/0054639 A1 | 2/2015 | Noonan |
| 2015/0069174 A1 | 3/2015 | Wang et al. |
| 2015/0077221 A1 | 3/2015 | Peters et al. |
| 2015/0079935 A1 | 3/2015 | Maguire et al. |
| 2015/0225072 A1 | 8/2015 | Torre |
| 2015/0279147 A1 | 10/2015 | Illingworth et al. |
| 2015/0356801 A1 | 12/2015 | Nitu et al. |
| 2015/0363749 A1 | 12/2015 | Buscher |
| 2016/0006922 A1 | 1/2016 | Boudreau et al. |
| 2016/0099590 A1 | 4/2016 | Velderman et al. |
| 2016/0180632 A1 | 6/2016 | Santana et al. |
| 2016/0300409 A1 | 10/2016 | Peters et al. |
| 2016/0380718 A1 | 12/2016 | Johnson |

(56) References Cited

U.S. PATENT DOCUMENTS

| | | |
|---|---|---|
| 2017/0048679 A1 | 2/2017 | Zhang et al. |
| 2017/0094520 A1 | 3/2017 | Salyers et al. |
| 2017/0094521 A1 | 3/2017 | Salyers et al. |
| 2017/0094534 A1 | 3/2017 | Salyers et al. |
| 2017/0261604 A1 | 9/2017 | Van Voorst |
| 2017/0286649 A1 | 10/2017 | Lowenthal et al. |
| 2017/0287295 A1 | 10/2017 | Aswath et al. |
| 2017/0345248 A1 | 11/2017 | Peters et al. |
| 2017/0358169 A1 | 12/2017 | Peters et al. |
| 2018/0062784 A1 | 3/2018 | Hodge |
| 2018/0062785 A1 | 3/2018 | Hodge |
| 2018/0062786 A1 | 3/2018 | Hodge |
| 2018/0097931 A1 | 4/2018 | Hodge |
| 2018/0167774 A1 | 6/2018 | Hodge |

FOREIGN PATENT DOCUMENTS

| | | |
|---|---|---|
| EP | 2182752 A1 | 5/2010 |
| EP | 2328130 A1 | 1/2011 |
| EP | 3032883 A2 | 6/2016 |
| WO | WO2007/137067 A2 | 11/2007 |
| WO | WO2008/073566 A2 | 6/2008 |
| WO | WO2012/174324 A1 | 12/2012 |

OTHER PUBLICATIONS

"Controlling Wireless Abuse in Restricted Areas", Cell Block Technologies, Inc., www.cell-block-r.com, Prison Review International, Apr. 2002, Best Available Date: Jul. 6, 2005 as last modified.

"No More 'Cell' Phones," TECHbeat, Winter 2005.

Efstathiou et al., "The Mobile-Phone Silencers Controversy," Jan. 2002, Athens: Athens University of Economics and Business, Department of Computer Science, Mobile Multimedia Library, Jan. 2002; 4 pages.

Excerpts from the Prosecution History of U.S. Appl. No. 11/504,979, filed Aug. 16, 2006.

Excerpts from the Prosecution History of U.S. Appl. No. 13/562,057, filed Jul. 30, 2012.

GSM Pocket Cellular Phone Detector, www.cellular.co.za, accessed Oct. 6, 2005.

U.S. Appl. No. 60/602,838, filed Aug. 19, 2004.

Xu, et al., "The Feasibility of Launching and Detecting Jamming Attacks in Wireless Networks," Urbana-Champaign, IL, 2005, available at https://nslab.kaist.ac.kr/courses/2006/cs710/paperlist/security/35.pdf; 12 pages, May 25-27, 2005.

Miller et al. "Jail Vulnerability Assessment: A Systems Approach to Improve Safety and Security," National Institute of Corrections World Wide Web Site www.nicic.org, NIC Accession No. 000000, Dec. 31, 2008, [retrieved on Jun. 4, 2018]. Retrieved from the Internet <URL: http://correction.org/wp-content/uploads/2014/10/Jail-Vulnerability-Assessment-JVA-Final-Draft.pdf> entire document.

International Search Report and Written Opinion of the International Searching Authority directed to related International Patent Application No. PCT/US2017/046596, dated Dec. 7, 2017; 12 pages.

International Search Report and Written Opinion of the International Searching Authority directed to related International Patent Application No. PCT/US2017/054974, dated Oct. 19, 2017; 10 pages.

International Search Report and Written Opinion of the International Searching Authority directed to related International Patent Application No. PCT/US2017/066248, dated Apr. 12, 2018; 12 pages.

International Search Report and Written Opinion of the International Searching Authority directed to related International Patent Application No. PCT/US2018/027142, dated Jul. 16, 2018; 13 pages.

Notice of Allowance for U.S. Appl. No. 11/504,979, dated Mar. 30, 2012; 5 pages.

Non-Final Office Action for U.S. Appl. No. 11/504,979, dated Jun. 22, 2011; 19 pages.

Non-Final Office Action for U.S. Appl. No. 11/504,979, dated May 14, 2010; 19 pages.

Final Office Action for U.S. Appl. No. 11/504,979, dated Nov. 9, 2011; 23 pages.

Final Office Action for U.S. Appl. No. 11/504,979, dated Oct. 26, 2010; 21 pages.

Notice of Allowance for U.S. Appl. No. 13/562,057, dated Aug. 2, 2013; 8 pages.

Non-Final Office Action for U.S. Appl. No. 13/562,057, dated Jan. 3, 2013; 23 pages.

Final Office Action for U.S. Appl. No. 13/562,057, dated Apr. 6, 2013; 29 pages.

Final Office Action directed to U.S. Appl. No. 15/188,592, dated Dec. 30, 2016; 6 pages.

Non-Final Office Action directed to U.S. Appl. No. 15/188,592, dated Apr. 28, 2017; 13 pages.

Non-Final Office Action directed to U.S. Appl. No. 15/188,592, dated Sep. 9, 2016; 5 pages.

Notice of Allowance directed to U.S. Appl. No. 14/030,451, dated Feb. 24, 2016; 8 pages.

Notice of Allowance directed to U.S. Appl. No. 14/030,451, dated Jul. 12, 2016; 7 pages.

Notice of Allowance directed to U.S. Appl. No. 14/030,451, dated Oct. 31, 2016; 2 pages.

Notice of Allowance directed to U.S. Appl. No. 14/030,451, dated Aug. 9, 2017; 7 pages.

\* cited by examiner

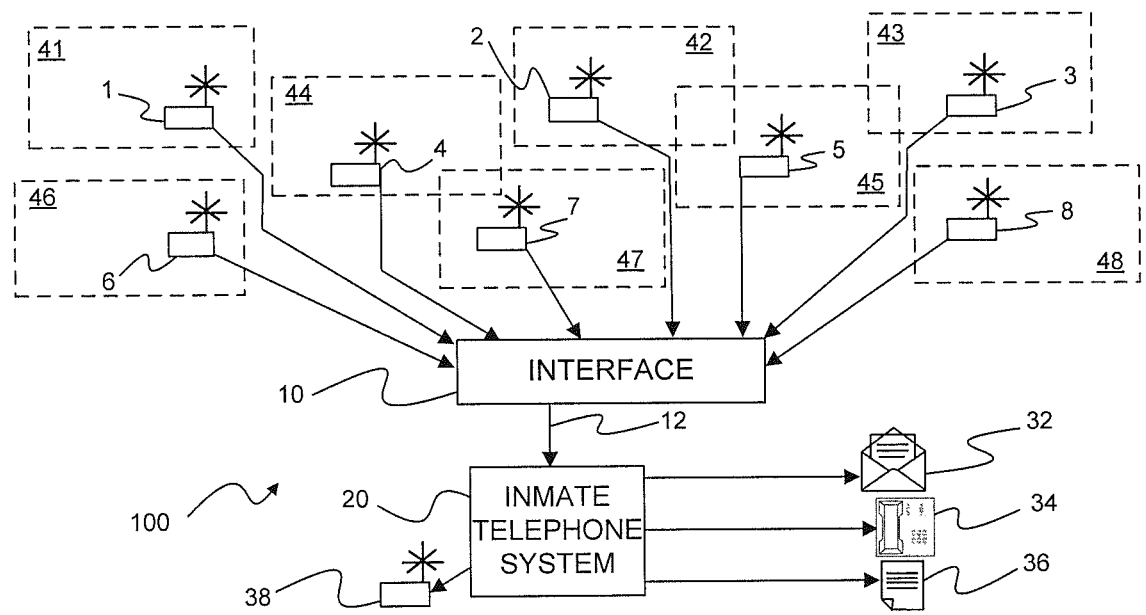

INTEGRATION OF CELLULAR PHONE DETECTION AND REPORTING INTO A PRISON TELEPHONE SYSTEM

CROSS-REFERENCE TO RELATED APPLICATIONS

This application is a continuation of U.S. application Ser. No. 15/262,842, filed Sep. 12, 2016, which is a continuation of U.S. application Ser. No. 14/096,291, filed Dec. 4, 2013, now U.S. Pat. No. 9,444,574, issued Sep. 13, 2016, which is a continuation of U.S. application Ser. No. 13/562,057, filed Jul. 30, 2012, now U.S. Pat. No. 8,606,229, issued Dec. 10, 2013, which is a continuation of application Ser. No. 11/504,979, filed Aug. 16, 2006, now U.S. Pat. No. 8,233,880, issued Jul. 31, 2012, which are incorporated by reference herein in their entirety.

BACKGROUND OF THE INVENTION

The present subject matter relates generally to a method and apparatus for detecting reporting the operation of cellular telephones within selected or predetermined areas. More particularly, the present subject matter relates to a method and apparatus for detecting the unauthorized operation of cellular telephones within security facilities including prisons and reporting such operation to selected officials.

The present subject matter is directed in one aspect, although not exclusively, towards the corrections environment. Various law enforcement entities find it desirable, even necessary (for example, such as required by law or circumstances), to monitor telephone conversations conducted by inmates in penal institutions or other detainees in similar facilities. Highly specialized telecommunications equipment and facilities must be provided to meet the various needs of governmental officials and others in addressing the desire to monitor and/or record telephone conversations under varying circumstances.

As telephone technology and, in particular, cellular technology, has become more advanced, workers in the corrections environment have found that it has become easier to hide and smuggle into corrections facilities very small cellular telephones that may be used by inmate and others to circumvent the required monitoring and/or recording operations. As a non-limiting example, the remainder of the present disclosure will refer to monitoring for cellular telephone activity within the above noted particular environment. It is to be strictly understood, however, that the present technology may be applied to and/or used within other areas where monitoring of cellular telephone activity may be of interest. For example, it may be desirable, for security or other purposes, to monitor cellular telephone activity in business or governmental environments where confidential or classified information is being discussed. Alternatively, there could be an interest in monitoring cellular telephone activity where operation of such devices is restricted or, for courtesy, deemed undesirable such as in restaurants, places of worship, theaters and similar locations. As such, it should be understood that the present technology has applicability to any situation where there is a need or desire to monitor cellular telephone activity within a prescribed area.

It has been common practice for many years in the corrections environment to record and/or monitor inmates' conversations. Such recording and monitoring takes place in the very controlled atmosphere of permitted inmate communications with individuals outside of the facilities housing prisoners or inmates. Normally prisoners are limited to a small number of individuals that they are permitted to call. These may include family members, their lawyers, and friends and may specifically exclude others, for example judges, jury members, witnesses, former co-conspirators and other like individuals to whom calls from a particular inmate may be of a harassing or other undesired nature. There may be time of day, length of call, three-way call or other restrictions on calls, all of which must be controlled by way of various instrumentalities that may include computer controlled equipment at the facility and/or at remote locations in addition to human monitoring and/or control. In almost all instances, such telephone calls must be recorded; yet even in those instances, there are conditions that may impact on the desire, ability, or legal right to record such conversations. For example, it is inappropriate to record or monitor conversations between an inmate and his/her attorney, and thus, measures must be taken to insure that, where calls are made from an inmate to his/her attorney, no recording is made or monitoring is allowed.

The particular needs described above have been addressed in the prior art, which, in major part, has provided responses to accommodate the majority of the needs addressed. Examples of such include LazerPhone™ and LazerVoice®, products provided by the assignee of the present subject matter. LazerPhone™ is a centralized, PC-based, integrated telephone system with features that provide control of inmate telecommunications activities. The system provides call blocking and monitoring, account control including personal identification number (PIN) setup and control, report generation including automated trouble reports, call activity reports and other administrative reports as well as numerous other features.

LazerVoice® is an optional feature of LazerPhone™ and provides a recording function for the LazerPhone™ system. LazerVoice® is a modular system that provides the ability to record at its installation site selected telephone conversations, permit monitoring by appropriate authorities of selected conversations, and store for later retrieval recorded conversations as well as other functions and operations involving the recording of telephone conversations. Additional information regarding these products may be found at the World Wide Web site, www.gtl.us, of the corporate owner of the present application interests.

While it is considered well known that the recording of inmate telephone conversations is advantageous to governmental agencies and appropriate authorities in that information regarding the security of facilities and general continuing or past criminal activity may be found in such recordings, advances in the cellular telephone technology have opened avenues for inmates to circumvent such monitoring and/or recording advantages. Maintaining the ability to insure control and/or monitoring of communications from or to a controlled facility is, therefore, an important aspect to previously implemented telecommunications systems. As noted, with the advances in cellular communications technology, such maintenance of capability is hindered by such issues as the clandestine delivery of prohibited equipment into a monitored facility. Due to the small size of certain of the more recently developed devices, such may avoid detection by more conventional search techniques including, but not limited to, walk through and manual metal detectors and even physical "pat-down searches.

While various aspects and alternative features are known in the field of telecommunications and telephone conversation monitoring, no one design has emerged that generally integrates all of the ideal features and performance characteristics as discussed herein.

SUMMARY OF THE INVENTION

The present subject matter recognizes and addresses several of the foregoing shortcomings, and others concerning certain aspects of monitoring telephone conversations within a corrections environment.

Thus, broadly speaking, aspects of some embodiments of the presently disclosed technology concern the provision of improved apparatus and corresponding methodology to provide for the continued monitoring of telephone conversation(s) between individuals within a corrections facility and called or calling parties outside such facilities. More particularly, certain aspects of some embodiments of the disclosed technology relate to an improved apparatus and corresponding methodology using radio frequency (RF) monitoring device(s), the provision and practice of which will help insure that any telephone conversations made from or to a corrections facility will have the maximum possible availability to authorized personnel.

Another aspect of certain embodiments of the present subject matter is to provide an improved apparatus and corresponding methodology that provides simple integration with existing corrections facilities telephone systems or, alternately, a significant option for new corrections facilities telephone system installations.

A further aspect of certain embodiments of the present subject matter is to provide an improved apparatus and corresponding methodology for conveniently notifying appropriate personnel of the operation of unauthorized telephone equipment within a corrections facility.

A still further aspect of certain embodiments of the present subject matter is to provide an improved apparatus and corresponding methodology for locating unauthorized telephone equipment within a corrections facility.

Additional aspects and advantages of the present subject matter are set forth in or will be apparent to those of ordinary skill in the art from the detailed description herein. Also, it should be further appreciated by those of ordinary skill in the art that modifications and variations to the specifically illustrated, referenced, and discussed features and steps hereof may be practiced in various embodiments and uses of this subject matter without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, features, steps, or the like.

Still further, it is to be understood that different embodiments, as well as different presently preferred embodiments, of this subject matter may include various combinations or configurations of presently disclosed features, steps, or elements, or their equivalents (including combinations of features or steps or configurations thereof not expressly shown in the FIGURE or stated in the detailed description).

A first exemplary embodiment of the present subject matter relates to an improved apparatus and corresponding methodology for monitoring for the presence of cellular telephones within a defined area.

Another exemplary embodiment of the present subject matter relates to an improved apparatus and corresponding methodology for automatically generating reports of violations of cellular telephone use regulations.

A more particular exemplary embodiment of the present technology relates to an improved apparatus and corresponding methodology for automatically notifying authorized personnel in real time of the operation of unauthorized communications equipment within a prescribed area.

Still another particular exemplary embodiment of the present subject matter involves a specialized phone system for use in relation to a prison environment, having an associated sensor system responsive to the operation of selected telecommunications apparatus. Such a system may include one or more cellular telephone detector(s) located at selected or predetermined location(s) within a corrections facility; an interface device, an inmate telephone system, and one or more report or alarm delivering devices. With such system, advantageously inmates will not be able to circumvent monitoring and/or recording of conversation data from inmate conversations conducted by way of unauthorized telephone instruments surreptitiously brought into the corrections facility.

Yet another present exemplary embodiment may relate to a cellular telephone detection system, comprising: a plurality of cellular telephone transmission detectors, an interface device, and a telephone system. In such present exemplary cellular telephone detection system, each such detector is preferably operatively associated with a predetermined zone and configured to produce a detection signal upon detection of cellular telephone transmissions within its respective predetermined zone. Such exemplary interface device is preferably coupled to each of the plurality of cellular telephone transmission detectors; and the exemplary telephone system is preferably coupled to such interface device, and otherwise configured to receive one or more detection signals from one or more of the plurality of cellular telephone transmission detectors and to generate one or more notification messages indicative of detected cellular telephone transmissions.

Present subject matter may likewise encompass a corresponding method for monitoring an area for cellular telephone transmissions.

Still further, present exemplary embodiments may relate to an inmate telephone system, comprising a plurality of cellular telephone transmission detectors, each detector operatively associated with a predetermined zone and configured to produce a detection signal upon detection of cellular telephone transmissions within its respective predetermined zone; and a telephone system. Such exemplary telephone system preferably is coupled to the plurality of cellular telephone transmission detectors, and configured to receive one or more detection signals from one or more of the plurality of cellular telephone transmission detectors and to generate one or more notification messages indicative of detected cellular telephone transmissions.

Additional embodiments of the subject technology, not necessarily expressed in this summarized section, may include and incorporate various combinations of aspects of features, parts, or steps referenced in the summarized objectives above, and/or features, parts, or steps as otherwise discussed in this application.

Those of ordinary skill in the art will better appreciate the features and aspects of such embodiments, and others, upon review of the remainder of the specification.

BRIEF DESCRIPTION OF THE DRAWING

A full and enabling description of the present subject matter, including the best mode thereof, directed to one of ordinary skill in the art, is set forth in the specification, which makes reference to the appended FIGURE, in which:

FIG. 1 is a generally representational block diagram illustrating an overview of the present subject matter.

Repeat use of reference characters throughout the present specification and appended drawing is intended to represent same or analogous features or elements of the present subject matter.

DETAILED DESCRIPTION OF THE DRAWING

As referenced in the Summary of the Invention section, supra, the present subject matter is directed towards an improved apparatus and corresponding methodology for monitoring for the unauthorized use of cellular telecommunications equipment within designated areas.

Reference will now be made to the presently disclosed technology, specifically with reference to FIG. 1. It will be observed from FIG. 1 that the present technology is directed to apparatus and a methodology for monitoring for the unauthorized use of certain types of telecommunications equipment within designated areas. The present subject matter is primarily directed to the detection of the unauthorized presence and/or use of cellular telephones. It should be borne in mind, however, that the present subject matter is not so limited in that the present subject matter may be used to detect the use of other types of unauthorized communications equipment including, for example text messaging devices, two-way pagers, and other types of radio frequency transmitting and/or devices that may be used to transmit and/or receive messages to or from a corrections facility.

With further reference to FIG. 1 it will be observed that there is illustrated a block diagram of a cellular telephone detection system 100 incorporated with an inmate telephone system. As mentioned earlier hereinabove, inmate telephone systems provide a number of features that may be used to assist law enforcement personnel in carrying out their obligations to monitor and/or record communications to and from inmates in a correctional facility. Such systems are readily available from several sources including the assignee of the present subject matter. The present subject matter relates to optional capability of such known systems in the form of a plurality of specially designed detectors that, when combined with known inmate telephone systems and, in particular, those of the present assignee, provide operational benefits that, in the aggregate, provide superior capabilities that simply installing a cell phone monitor in selected or predetermined locations.

With further reference to FIG. 1, it will be appreciated that there is illustrated a number of monitoring devices 1-8, each of which may be placed in a cellblock within a corrections facility or in some other appropriate location within the corrections facility including conference rooms, recreational areas, libraries, medical facilities, or other locations within the correctional facility. Each such possible location may be identified as a "zone" and designated with a zone number 41-48 corresponding to monitoring devices 1-8.

Monitoring devices 1-8 may be coupled by way of individual cables to an interface device 10 which is configured to couple signals by way of coupling cable 12 to an inmate telephone system 20. It should be appreciated that other connection methodologies may be employed to couple the monitoring devices 1-8 to interface 10 including optical coupling as, for example, with an optical waveguide corresponding to an optical cable, or by other communications methodologies including, but not limited to radio frequency (RF) techniques including, but again not limited to, Bluetooth @, WiFi, dedicated RF transmission systems, and other wired or wireless technologies. Interface device 10 may be configured to receive a signal from individual monitoring devices 1-8 and to provide information to inmate telephone system 20 that, first, a signal has been detected by a monitoring device and, second, the location of the monitoring device from which the signal was detected.

Information as to location of the various monitoring devices 1-8 may be a part of a data stream sent from the device itself that also includes monitoring activity signals, or may be added to monitoring activity signals received from individual monitoring devices based on pre-established information recorded or entered into the interface device at the time of installation of the monitor devices 1-8 as well as the interface device 10. Alternatively, location information may be recorded within the inmate telephone system 20 itself as, for example, a look-up chart in a memory or file contained within, or as a part of, the inmate telephone system 20.

Regardless of the methodology by which information is conveyed from the detection devices 1-8 and/or interface device 10, such information may be supplied to inmate telephone system 20 in a form corresponding to date and time of detection as well as zone in which, or device from which, a signal has been detected. Upon receipt of the detection information, telephone system 20 may be configured to respond in one or more selected ways. As will be appreciated by those of ordinary skill in the prison telephone system art, prison telephone systems and in particular those available from the assignee of the present subject matter, may be configured to respond in various manners upon detection of specific telephone related events. Such may include the attempted initiation of a call by an inmate to an unauthorized called party or even the utterance of selected words indicative or prohibited activities. In such instances pre-selected communications may automatically be initiated to alert appropriate personnel to the occurrence of a potentially relevant event.

In a similar manner, the technology of the present subject matter allows a user to designate selected responses to the detection of unauthorized telecommunication equipment by providing selected alarms or notification messages to appropriate personnel by way of the inmate telephone system 20. In accordance with the present technology, upon detection of operation of unauthorized telecommunication equipment, signals are sent from one or more detector devices 1-8 in corresponding detection zones 41-48 by way of interface device 10 to inmate telephone system 20.

Inmate telephone system 20 may have been previously configured to respond by sending or generating notification messages corresponding to any combination of emails 32, telephone messages 34 and or information reports 36 to appropriate personnel and/or information storage systems. For purposes of the present disclosure, email may include any form of non-verbal electronic communication including standard email as well as text messages and instant messages, all of which may be transmitted by any available communications channel including those provided by both wired and wireless transmission 5 technologies. Telephone messages 34 may include pre-recorded voice messages or any form of automated audible communications included simulated voice announcements as well as encoded tones or other human perceptible sounds.

It should be appreciated that the chosen responses or combinations of 0 responses generated or sent by inmate telephone system 20 may be reconfigured from time to time as necessary or desirable. It should further be appreciated that emails 32 may be sent to locations within as well as outside of the correctional facility. In addition, telephone messages 34 may take the form of automated voice messages conveying selected information to personnel both inside as well as outside the corrections facility. Such information may convey only that a detection of unauthorized telecommunications equipments has been made so as to alert appropriate personnel to take appropriate actions, or may include any or all collected information including location or zone from which the detection of unauthorized use has occurred as well as date and time information if desired. Finally, an information log or file 36 may be created for current or future uses as desired.

In certain additional, though generally limited, circumstances, it may be desirable for the inmate telephone system to be configured for controlling and activating jamming technology, as generally represented by jammer device 38. For example, in a hostage situation, or in riot conditions, it may be authorized and desirable for the non-authorized use of cell phones to be jammed. In those instances, an appropriately configured inmate telephone system 20 in accordance with the present subject matter, could activate and appropriately control representative jammer device 38.

The present technology is designed primarily to detect unauthorized operation of telecommunication equipment within one or more detection zones based on the detection capabilities of the detector device 1-8. It is contemplated that such detection devices may incorporate sensitivity adjustment means that may include, but are not limited to; signal level comparators, antenna sensitivity adjustment means, as well as other signal discriminating methodologies to provide a measure of adjustability to individual detection zones.

In certain alternatives, it may be desired to have the subject detector devices 1-8 be capable of also detecting non-cellular two-way communication devices (for example, two-way radios, such as used by guards). However, in those instances, in may further be desired and within the present subject matter that the resulting system is provided so as to be selectively responsive to such non-cellular based communications devices, depending on particular needs in a given circumstance.

It should be noted that while the principal concept according to the present technology is to limit detection to a particular zone of detection by the above enumerated methodologies, the present subject matter may incorporate triangulation features based on relative signal levels within monitored zones. Such triangulation methodologies would then include an indication of detected signal level within a detection zone which information may also be sent to inmate telephone system 20 for analysis. The preferred detection method, however, is a zone detection method wherein even if a single unauthorized piece of telecommunications equipment triggers plural zone detections, all such zones will "report in" to the inmate telephone system 20 which would then generate plural indications of unauthorized operation of telecommunications equipment.

As may be observed from an inspection of FIG. 1, certain of the detection zones 41-48 may partially overlap other of the detection zones, while others of the detection zones may not be overlapped. For instance, detection zones 41, 46, and 48 are independent detection zones while zones 44 and 47 partially overlap and zone 45 partially overlaps both zones 42 and 43. Should a signal be detected from any of the detection zones, each zone may then be investigated by appropriate personnel as necessary or required. Such multiple reporting provides a far simpler and, possibly, more reliable detection system than having to rely on triangulation methodologies involving signal levels that may be adversely affected by a great variety of signal absorbing entities including not only permanent elements including building structure but also indeterminate elements including numbers of individuals within a specific area.

Thus there has been described an apparatus and methodology for detecting operation of unauthorized telecommunication equipment in designated locations. Moreover the disclosed apparatus and methodology petmits selected communication of such detection to appropriate personnel in selected ways in real time so that appropriate responses may be made.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An inmate telephone system incorporating a cellular telephone detection system for detecting unauthorized cellular telephone usage within predetermined zones within a facility, comprising:
   a first cellular telephone transmission detector having a first zone of detection and configured to produce a first detection signal upon detection of a cellular telephone transmission within the first zone of detection, the first detection signal indicating that the first cellular telephone transmission was detected within the first zone of detection and including first information indicative of a first detection time;
   a second cellular telephone transmission detector having a second zone of detection and configured to produce a second detection signal upon detection of the cellular telephone transmission within the second zone of detection, the second detection signal indicating that the second cellular telephone transmission was detected within the second zone of detection and including second information indicative of a second detection time; and
   a cellular telephone detector processor having an interface device coupled to each of the first and second cellular telephone transmission detectors, the cellular telephone detector processor configured to:
   receive the first and second detection signals; and
   determine that the first detection signal and the second detection signal are indicative of the same detected cellular telephone transmission based on the first detection time, the second detection time, and whether the first zone of detection overlaps the second zone of detection.

2. The inmate telephone system of claim 1, further comprising:
   a radio frequency jamming device configured to jam a source of the first or second cellular telephone transmission within the first or second zones of detection in response to the determination that the first detection signal and the second detection signal are indicative of the same detected cellular telephone transmission.

3. The inmate telephone system of claim 1, wherein the first and second cellular telephone transmission detectors produce the first and second detection signals, respectively, upon detecting a non-cellular two-way communication.

4. The inmate telephone system of claim 1, wherein a range of the first zone of detection is adjustable.

5. The inmate telephone system of claim 4, wherein the first zone of detection is adjustable by adjusting a signal level comparator.

6. The inmate telephone system of claim 4, wherein the first zone of detection is adjustable by adjusting antenna sensitivity.

7. The inmate telephone system of claim 4, wherein a range of the second zone of detection is adjustable.

8. The inmate telephone system of claim 1, the cellular telephone detector processor further configured to determine a location of a cellular telephone by using a triangulation methodology based on relative signals levels associated with the first and second detection signals.

9. The inmate telephone system of claim 1, wherein the first and second cellular telephone transmission detectors are positioned such that the first and second zones of detection at least partially overlap.

10. The inmate telephone system of claim 1, wherein the first and second cellular telephone transmission detectors are positioned such that the first and second zones of detection do not overlap.

11. A non-transitory computer-readable medium having instructions stored thereon, execution of which by a computing device causes the computing device to perform operations comprising:
receiving a first detection signal from a first cellular telephone transmission detector and a second detection signal from a second cellular telephone transmission detector, the first cellular telephone transmission detector having a first zone of detection and configured to produce the first detection signal upon detection of a cellular telephone transmission within the first zone of detection, and the second cellular telephone transmission detector having a second zone of detection and configured to produce the second detection signal upon detection of the cellular telephone transmission within the second zone of detection, the first detection signal including first information indicative of a first detection time, and the second detection signal including second information indicative of a second detection time; and
determining that the first detection signal and the second detection signal are indicative of the same detected cellular telephone transmission based on the first detection time, the second detection time, and whether the first zone of detection overlaps the second zone of detection.

12. The non-transitory computer readable medium of claim 11, the operations further comprising:
transmitting a jamming control signal to a radio frequency jamming device that causes the radio frequency jamming device to jam a source of the first or second cellular telephone transmission within the first or second zones of detection in response to the determination that the first detection signal and the second detection signal are indicative of the same detected cellular telephone transmission.

13. The non-transitory computer-readable medium of claim 11, wherein the first and second cellular telephone transmission detectors produce the first and second detection signals, respectively, upon detecting a non-cellular two-way communication.

14. The non-transitory computer-readable medium of claim 11, the operations further comprising determining a location of a cellular telephone using a triangulation methodology based on relative signals levels associated with the first and second detection signals.

15. The non-transitory computer-readable medium of claim 11, wherein a range of the first zone of detection is adjustable.

16. A computer-implemented method for detecting unauthorized cellular telephone usage within predetermined zones within a facility, the method comprising:
providing a first cellular telephone transmission detector having a first zone of detection and configured to produce a first detection signal upon detection of a cellular telephone transmission within the first zone of detection, the first detection signal indicating that the first cellular telephone transmission was detected within the first zone of detection and including first information indicative of a first detection time;
providing a second cellular telephone transmission detector having a second zone of detection and configured to produce a second detection signal upon detection of the cellular telephone transmission within the second zone of detection, the second detection signal indicating that the second cellular telephone transmission was detected within the second zone of detection and including second information indicative of a second detection time;
receiving the first detection signal from the first cellular telephone transmission detector and the second detection signal from the second cellular telephone transmission detector; and
determining that the first detection signal and the second detection signal are indicative of the same detected cellular telephone transmission based on the first detection time, the second detection time, and whether the first zone of detection overlaps the second zone of detection.

17. The method of claim 16, further comprising transmitting a jamming control signal to a radio frequency jamming device configured to jam a source of the first or second cellular telephone transmission within the first or second zones of detection in response to the determination that the first detection signal and the second detection signal are indicative of the same detected cellular telephone transmission.

18. The method of claim 16, wherein the first and second cellular telephone transmission detectors are positioned such that the first and second zones of detection at least partially overlap.

19. The method of claim 16, wherein the first and second cellular telephone transmission detectors are positioned such that the first and second zones of detection do not overlap.

20. The method of claim 16, wherein the first and second cellular telephone transmission detectors produce the first and second detection signals, respectively, upon detecting a non-cellular two-way communication.

* * * * *